(No Model.)

L. E. WHITON.
BICYCLE TIRE.

No. 345,351. Patented July 13, 1886.

Attest:
Wallern Donaldson
F. L. Middleton

Inventor
Lucius E. Whiton
by Joyce & Kear
Attys.

UNITED STATES PATENT OFFICE.

LUCIUS E. WHITON, OF WEST STAFFORD, CONNECTICUT.

BICYCLE-TIRE.

SPECIFICATION forming part of Letters Patent No. 345,351, dated July 13, 1886.

Application filed November 14, 1885. Serial No. 182,877. (No model.)

*To all whom it may concern:*

Be it known that I, LUCIUS E. WHITON, of West Stafford, in the State of Connecticut, have invented a new and useful Improvement in Bicycle-Tires; and I do hereby declare that the following is a full, clear, and exact description of the same.

My invention relates to tires for the wheels of bicycles and other vehicles having tires of rubber, its object being to hold the tire securely to the wheel. Generally such tires are held to the wheels of bicycles by cement, which, under wear, becomes loosened and occasions danger and much inconvenience to the rider, as well as costs of repairs. This liability I avoid by using a series of metallic strips or sections embedded in the rubber, and by means of fastening device hold the rubber to the wheels.

The best methods known to me for carrying out my invention are shown in the accompanying drawings, in which—

Figure 1:
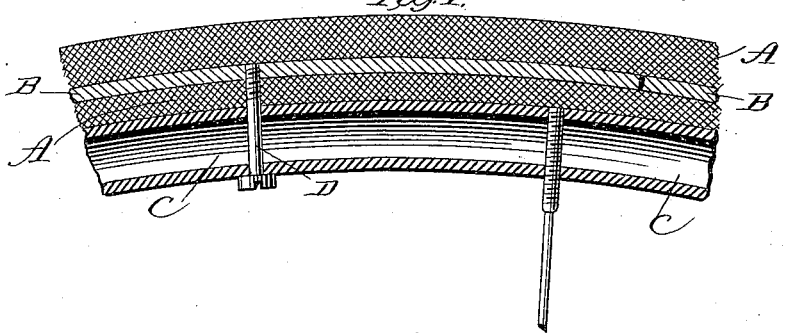
Figure 2:
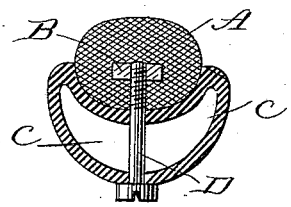
Figure 3:
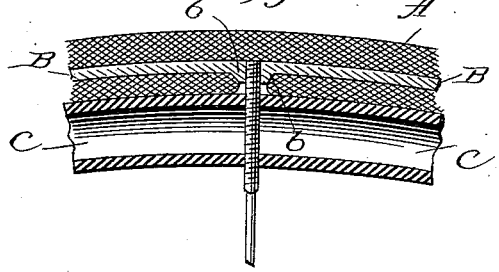
Figure 4:
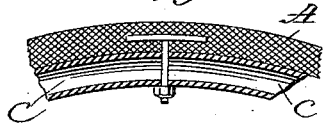
Figure 5:
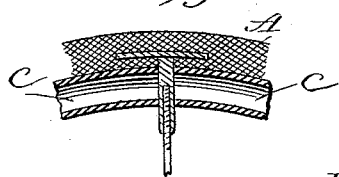

Figure 1 represents a longitudinal section of the tire. Fig. 2 represents a transverse section. Fig. 3 shows a longitudinal section of a modified form of the tire. Figs. 4 and 5 also represent modifications.

In the drawings, A represents an ordinary rubber tire, such as those used on the wheels of bicycles. Within this is a steel strip, B, bent to a proper circle and embedded in the rubber in the process of forming the tire. The felly of an ordinary bicycle is shown at C, and the tire is held to this felly by means of screws D, which pass through the felly from the inside and enter threaded holes in the steel strip. This tire may be conveniently made by forming the steel strip in proper length, and with threaded holes in required number and position. After being bent to the proper curve, the steel strip should be cut apart in one or more places, forming sections, in order that when embedded in the tire the sections may separate slightly and allow the tire to expand longitudinally when sprung into place. The sections are supported in the mold by means of screws of the same size and number of threads as those to be afterward used for fastening the tires to the wheel, these screws projecting from the inner side of the mold into the threaded holes in the strips, whereby the strips are held in proper position to leave them embedded at or near the center of the tire. The rubber is then molded in the ordinary manner and surrounds the strips and the screws by which the strips are held. After the rubber is hardened, the screws used to hold the steel strips in the mold are turned out. The tire with holes for the screws all in proper place, and with its embedded strips, may then be stretched over the felly. It is turned until the holes in the tire register with the holes in the felly, when the screws D may be inserted, and the tire is secured permanently in place.

Instead of using separate screws D, I may use the spokes to fasten the strips by extending the spokes and causing the threaded ends thereof to pass into the holes in the steel strips. Further, I prefer to use steel strips rolled with lugs, as shown in Fig. 3. These lugs, $b$, are on the inside of the tire, and the holes are tapped through them. I form the lugs in order that the spokes may be as positively connected to the wheel in this modification and the wheel as firm as when the spokes are connected directly to the felly, as hereinafter described. A cavity is formed on the inside of the rubber tire, from the surface into the lug on the steel strip, to allow compression of the rubber, and thus increase the firmness with which it may be held. By screwing up a spoke the lug is drawn in to compress the rubber until the lug bears on the outer surface of the felly, acting like an ordinary screw-nut. The recess will not appear, and as the lugs all around the wheel are drawn into contact with the felly the wheel is stiff as if the spokes were secured directly into the felly. This modification renders extra holes in the felly unnecessary, and avoids the screw-heads on the inner surface of the felly. Though the steel strip is better, I do not confine myself to this metal.

In Figs. 4 and 5 still another modification is shown, in which, instead of the sections having the holes bored through them to receive the ends of the bolts or spokes, the sections are represented as provided with clips made integral therewith or secured thereto before the sections are placed in position, these clips projecting out and having screw-threaded ends to receive the nut by which it is fastened to the felly, or, as shown in Fig. 5, with the end tapped to receive the screw-threaded end of the spoke.

I am aware that prior to my invention it had been suggested, as a means of attaching tires to wheels, to form the tire tubular, with spaces at intervals for the insertion of bolts with eyes, and then passing a wire or rod through the tubular tire and the eyes of the bolt; and this I do not claim, my invention consisting in embedding in the rubber of the tire a series of metallic strips or sections, and uniting the tire to the wheel by means of fastening devices connected with the strips or sections.

I claim as my invention—

1. In combination with a rubber tire, a series of metallic strips or sections embedded therein, and fastening devices for connecting said series of sections with the fellies or spokes, substantially as described.

2. A tire for wheels, having an embedded strip formed of sections, and having holes combined with the felly and holding-screws, substantially as described.

3. A rubber tire for the wheels of bicycles, having an embedded strip formed with lugs and holes, combined with the felly and spokes, substantially as described.

In testimony whereof I have signed my name to this specification in the presence of two subscribing witnesses.

LUCIUS E. WHITON.

Witnesses:
HENRY LUFLER,
PLINY M. HARWOOD.